United States Patent [19]

Iino

[11] Patent Number: 4,595,046

[45] Date of Patent: Jun. 17, 1986

[54] CONTROL APPARATUS FOR HEAT EXCHANGER

[75] Inventor: Takashi Iino, Fujimi, Japan

[73] Assignee: Taisei Kogyo Co., Ltd., Tokyo, Japan

[21] Appl. No.: 542,205

[22] Filed: Oct. 14, 1983

[30] Foreign Application Priority Data

Dec. 11, 1982 [JP] Japan .................. 57-187620[U]

[51] Int. Cl.$^4$ .................. G05D 23/12; B60H 1/00
[52] U.S. Cl. .................. 165/39; 137/901; 236/99 K; 236/100
[58] Field of Search .................. 165/39, 32, 96; 236/100, 99 K; 137/533.11, 533.13, DIG. 2; 251/82

[56] References Cited

U.S. PATENT DOCUMENTS

| | | | |
|---|---|---|---|
| 824,442 | 6/1906 | Schlemmer | 137/DIG. 2 |
| 1,173,620 | 2/1916 | Thompson | 137/533.11 |
| 1,839,730 | 1/1932 | Baten et al. | 137/533.11 X |
| 1,992,796 | 2/1935 | Young | 165/37 |
| 2,330,468 | 9/1943 | Brisbane et al. | 137/533.13 |
| 2,433,454 | 12/1947 | Hoffman | 165/38 |
| 2,864,589 | 12/1958 | Booth et al. | 236/100 |
| 3,109,589 | 11/1963 | Kimm | 236/99 K |
| 3,145,928 | 8/1964 | Parker et al. | 236/99 K |
| 3,730,260 | 5/1973 | Raymond | 165/27 |
| 4,175,697 | 11/1979 | Dreibelbis | 236/100 X |
| 4,183,466 | 1/1980 | Dreibelbis | 236/100 X |
| 4,273,310 | 6/1981 | Ginzler | 137/DIG. 2 X |
| 4,337,621 | 7/1982 | Lane et al. | 236/100 X |

FOREIGN PATENT DOCUMENTS

| | | |
|---|---|---|
| 0029129 | 5/1981 | European Pat. Off. . |
| 0046476 | 3/1982 | European Pat. Off. ............. 165/39 |
| 0048234 | 3/1982 | European Pat. Off. ............. 165/39 |
| 0111673 | 6/1984 | European Pat. Off. ............. 165/39 |
| 2424242 | 12/1974 | Fed. Rep. of Germany ...... 236/100 |
| 2255826 | 7/1975 | France . |

OTHER PUBLICATIONS

Energie, vol. 22, No. 6, Jun. 1970, Technischer Verlag Resch KG, 8032 Grafelfing (DE). "Planen, Prufen, Investieren Temperaturregelung mittels Dehnstoff", pp. 169-196.

Primary Examiner—Sheldon J. Richter
Assistant Examiner—Randolph A. Smith
Attorney, Agent, or Firm—Oblon, Fisher, Spivak, McClelland & Maier

[57] ABSTRACT

A control apparatus used for a heat exchanger having a casing through which a first fluid flows and a tube disposed within the casing for a second fluid to flow therethrough, thereby allowing a heat exchange to occur between the first and second fluids, the control apparatus being so arranged as to change the flow rate of the second fluid in accordance with a change in temperature of the first fluid so as to maintain the temperature of the first fluid at a constant level, comprises a valve housing having a valve seat and communicating with an inlet port of the tube, a valve body disposed in the valve housing and movable between a closing position where the valve body is placed on the valve seat to prevent the second fluid from flowing into the tube and an opening position where the valve body is separated from the valve seat to allow the second fluid to flow into the tube.

3 Claims, 9 Drawing Figures

CONTROL APPARATUS FOR HEAT EXCHANGER

BACKGROUND OF THE INVENTION

The present invention relates to a control apparatus for a heat exchanger, which apparatus has a casing through which a first fluid flows and a tube disposed within the casing for a second fluid to flow therethough, allowing a heat exchange to occur between the first and second fluids; the control apparatus being so arranged as to alter the flow rate of the second fluid in accordance with a change in temperature of the first fluid, thereby maintaining the temperature of the first fluid at a constant level.

In a hydraulic apparatus having a circuit for supplying a working oil from a reservoir to a predetermined equipment, through a pump, and for returning the working oil from the predetermined equipment to the reservoir; the working oil is heated by compression in the pump and by the work performed in the equipment. If the temperature of the working oil greatly exceeds a given value, the performance of the working oil is degraded and, hence, the hydraulic apparatus will not attain a predetermined performance level. To avoid this outcome, the hydraulic apparatus has an oil cooler which serves to keep the working oil within a predetermined temperature range.

The oil cooler is a kind of heat exchanger and has a casing through which the working oil flows and a plurality of tubes disposed within the casing for a cooling medium, such as water, to flow therethrough. And, in this oil cooler, heat is conducted from the working oil serving as the first fluid to the cooling medium which serves as the second fluid, so that the temperature of the working oil falls.

In a hydraulic apparatus in which the work load of the working oil within a predetermined equipment frequently changes, increases in the temperature of the working oil are frequently subject to change. Therefore, such kind of hydraulic apparatus generally has a control apparatus for changing a flow rate of the cooling medium in the oil cooler in accordance with a change in temperature of the working oil, thereby keeping the working oil within the predetermined temperature range.

A conventional control apparatus consist of an electromagnetic valve which communicates with an inlet port of each of a plurality of tubes for channeling cooling water through the casing of the oil cooler and which serves to open/close the inlet port, and a temperature sensor for detecting the temperature of the working oil flowing into the casing of the oil cooler. And, when the temperature of the working oil falls below a predetermined value the electromagnetic valve closes the inlet port to stop the flow of the cooling medium in the oil cooler, and, when the temperature of the working oil has reached the predetermined value the temperature sensor supplies a signal to the electromagnetic valve to make the electromagnetic valve open the inlet port for allowing flow of the cooling medium.

In the conventional control apparatus having the construction described above, the electromagnetic valve and the temperature sensor must be separately disposed on the oil cooler. Furthermore, since an external power supply for driving the electromagnetic valve and a related electric circuit are required, the number of component parts is increased, resulting in a complex structure. Therefore, the manufacturing cost is increased, the assembly operation is time-consuming, and the control apparatus cannot be made compact.

SUMMARY OF THE INVENTION

The present invention has been contrived in view of the above situation, its object is to provide a control apparatus for a heat exchanger, wherein only a small number of component parts is required and a compact construction is provided which allows for easy assembly, so that both the control apparatus and the heat exchanger equipped with the control apparatus can be made compact.

To achieve the above object, a control apparatus for a heat exchanger is provided, which has a casing through which a first fluid flows and a tube disposed within this casing for a second fluid to flow therethrough, to allow heat exchange between the first and second fluids, the control apparatus being so arranged as to change the flow rate of the second fluid in accordance with a change in temperature of the first fluid, thereby maintaining the temperature of the first fluid at a constant level, which comprises: a valve housing having a valve seat and communicating with an inlet port of said tube; a valve body disposed within said valve housing in such a way as to be movable between a closing position where said valve body is placed on said valve seat to prevent the second fluid from flowing into said tube of the heat exchanger and an opening position where said valve body is separated from said valve seat to allow the second fluid to flow into said tube of the heat exchanger; biasing means for biasing said valve body to the closing position; and a drive unit having a vessel mounted on said casing in such a way that part of said vessel is exposed to the first fluid which is flowing into said casing, wax filled in said vessel and being expandable upon an increase in a temperature, an elastic sleeve member having, one end of which opens to said valve housing and the other end of which extends into said wax in said vessel so as to be surrounded by said wax, said elastic sleeve member being elastically compressible by the expansion of said wax, and a rod having one end inserted into said elastic sleeve member and the other end extending into said valve housing, said rod being moved toward said valve housing upon the compression of said elastic sleeve member to move said valve body from the closing position to the opening position against said biasing means.

According to the control apparatus of the present invention, part of the vessel of the drive unit is exposed within the casing of the heat exchanger, so that the vessel serves as a temperature sensor for the first fluid flowing into the casing. Furthermore, wax which is expandable upon an increase in temperature is filled in the vessel. An increase in the volume of the wax drives the rod. The rod then drives the valve body. As a result, no external power supply or related electric circuit need be used.

According to the control apparatus having the construction described above, the number of component parts is small, allowing for a control apparatus which is structurally simple. Therefore, since the manufacturing and assembly operations can be simplified, the control apparatus and the heat exchanger including the control apparatus can be made compact.

In the control apparatus of the present invention, it is preferable that the valve seat of the valve housing faces a direction opposite to the direction in which the gravitational acceleration acts, the valve body has a spherical shape, and the biasing means is a gravity acting on said valve body and a pressure of the second fluid flowing into the valve housing.

When the control apparatus has the above construction, it must be so oriented that the valve seat of the valve housing faces upward, in a direction opposite to the direction in which the gravitational acceleration acts. However, despite this limitation, the structure of the control apparatus can be simplified, thereby simplifying the manufacturing and assembly processes.

When the control apparatus has the above construction, it is preferable that a channel housing having a channel is coupled to the valve housing, said vessel of said drive unit is so disposed on said channel housing that a part of said vessel is exposed in the channel of said channel housing, the valve housing communicates with the inlet port of the tube of the heat exchanger through a first extended tube, and the channel of the channel housing communicates with an inlet port of the casing of the heat exchanger through a second extended tube.

With such construction, where the heat exchanger has any construction, the control apparatus having been such constructed is always able to be arranged in such a way that the valve seat can be directed in a direction in which the gravitational acceleration acts.

In the control apparatus of the present invention, the valve body can alternatively be attached at the other end of the rod and the biasing means may be a coil spring disposed within the valve housing.

When the control apparatus is constructed as described above, the construction of the control apparatus becomes simple and the manufacturing and assembly operations can be simplified, so that the control apparatus can be operated irrespective of the direction in which the gravitational acceleration.

In this case, it is preferable that the valve housing has a through hole opened to the external atmosphere and a cap screwed into the through hole, and that one end of the coil spring abuts against the valve plug and the other end thereof abuts against the cap.

Even if the valve body and the coil spring are broken, they can easily be replaced. Furthermore, by rotating the cap in the through hole of the valve housing the cap can be located at any position in the through hole, thereby changing the biasing force of the coil spring and hence variously changing the flow rate of the second fluid.

Furthermore, when the control apparatus of the present invention is constructed as described above, the valve housing can have a tubular valve seat support member screwed into the fluid channel, and a valve seat member which has a valve seat and is screwed into the valve seat support member, wherein one end of the coil spring abutting against the valve body and the other end thereof abutting against the valve seat support member.

When the control apparatus has the above construction, the diameter of the valve seat can be easily changed, as needed.

In the present invention, by changing the ratio of components of the wax, the temperature at which the wax changes from the solid phase to the liquid phase and increases its volume can be freely set.

Furthermore, in the control apparatus of the present invention, the vessel of the drive unit may be disposed on the casing so as to expose a part of the vessel of the drive unit within the casing and the valve housing may be adjoined to the casing.

With such construction, the heat exchanger having the control apparatus described above can be made more compactly.

Preferred embodiments of the present invention will now be described with reference to the accompanying drawings.

DETAILED DESCRIPTION OF THE PREFERRED EMBODIMENTS

Figure 1:
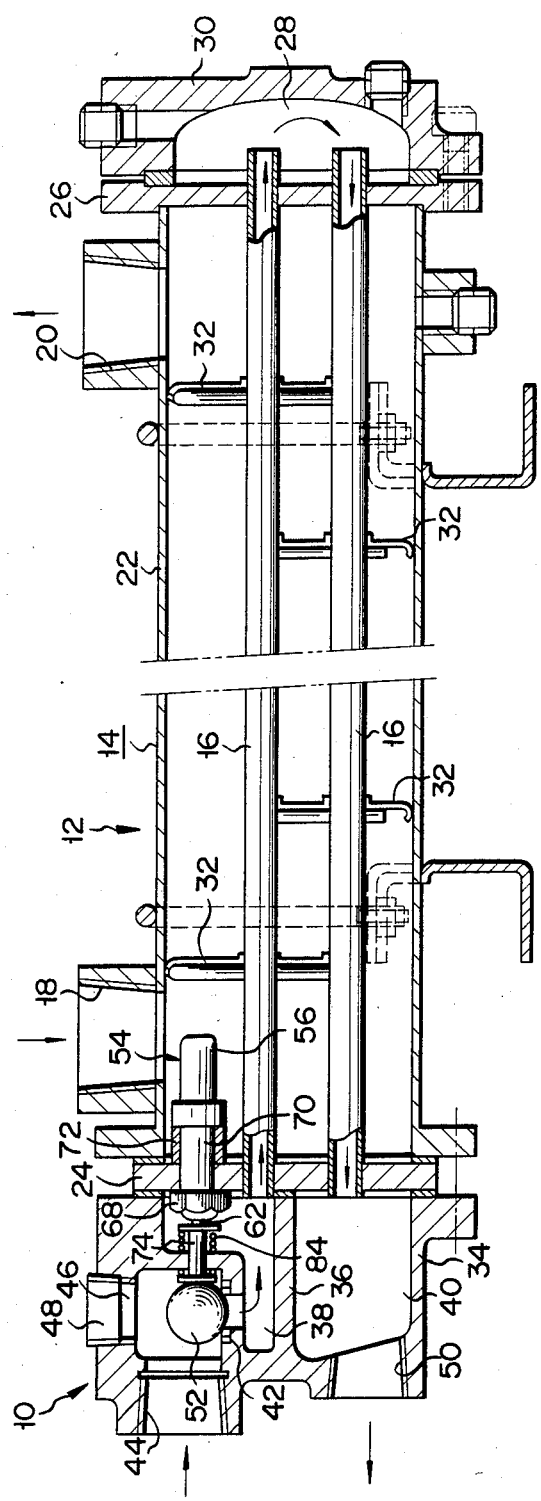
FIG. 1 is a longitudinal sectional view of an oil cooler (i.e., a heat exchanger) having a control apparatus according to a first embodiment of the present invention.

FIG. 1 is a longitudinal sectional view of an oil cooler 12 which serves as a heat exchanger having a control apparatus 10 according to a first embodiment of the present invention.

The oil cooler 12 has a casing 14 through which a working oil serving as a first fluid flows, and a plurality of tubes 16 through which a cooling medium, such as water, serving as a second fluid flows. The casing 14 has a hollow body housing 22 having a fluid inlet port 18 and a fluid outlet port 20, a first end plate 24 for closing one end of the body housing 22 and for supporting one end of each of the plurality of tubes 16, a second end plate 26 for closing the other end of the body housing 22 and for supporting the other end of each of the plurality of tubes 16, and a channel case 30 having a dome-like recess 28 covering the other ends of all of the plurality of tubes 16 to allow communication between the other ends of the plurality of tubes 16, the channel case 30 being watertightly coupled to the second end plate 26. The plurality of tubes 16 are disposed in a two-step manner, as shown in FIG. 1, and the upper and lower tubes are arrayed in a direction perpendicular to the surface of FIG. 1. Inside the housing 22 of the casing 14 a plurality of baffle boards 32 are disposed.

A valve housing 34 is coupled in a watertight manner to the first end plate 24 of the casing 14. The inner space of the valve housing 34 is divided by a partition wall 36 into an inlet channel 38 which communicates with the one end of each of the plurality of upper tubes 16 and an outlet channel 40 which communicates with the one end of each of the plurality of lower tubes 16. In the inlet channel 38, a valve seat 42 is formed, the valve seat 42 faces upward which is a direction opposite the direction (downward direction in FIG. 1) along which the gravitational acceleration acts. Inlet openings 44 and 46 are also formed in the inlet channel 38 at the upstream side of the valve seat 42, and one of the inlet openings 44 and 46 is closed by a plug 48. In the outlet channel 40 an outlet opening 50 is formed.

A spherical valve body 52 is seated on the valve seat 42 to close the inlet channel 38 in a watertight manner.

A drive unit 54 is so disposed on the first end plate 24 of the casing 14 as to move the valve body 52 from the closing position (FIG. 1) to the opening position.

Figure 2:
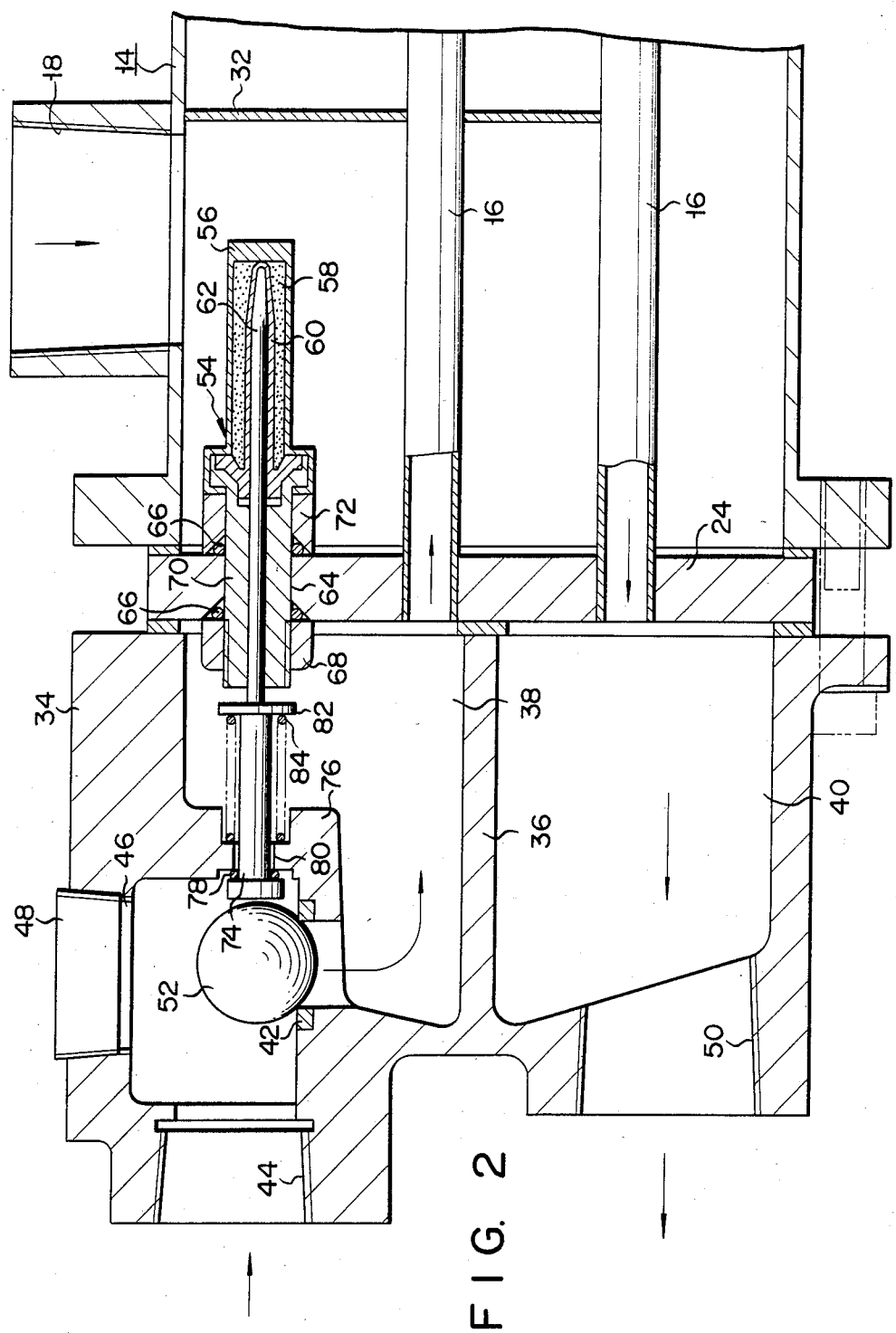
FIG. 2 is an enlarged view of the control apparatus shown in FIG. 1, wherein a valve body is located in the closing position.

As illustrated in detail in FIG. 2, the drive unit 54 comprises: a vessel 56 mounted on the casing 14 in such a way that part of said vessel 56 is exposed to the flow of the working oil which is flowing into the casing 14; wax 58 filled in the vessel 56 and being expandable upon an increase in temperature; an elastic sleeve member 60 having one end which opens to the valve housing 34 and the other end which extends into the vessel 56 so as to be surrounded by the wax 58, the elastic sleeve member 60 being elastically compressible by the expansion of the wax 58; and a rod 62 having one end inserted into the elastic sleeve member 60 and the other end extending into the valve housing 34, the rod 62 being movable toward the valve housing 34 by the compression of the elastic sleeve member 60.

In this embodiment, the vessel 56 is fixed at the insertion end of a metal sleeve member 70 watertightly attached by a nut 68 to the first end plate 24 through a seal ring 66. This seal ring 66 is inserted into a through hole 64 formed in a part of the first end plate 24 of the casing 14, the part being exposed to the inlet channel 38 of the valve housing 34. The elastic sleeve member 60 is arranged in concentric to the metal sleeve member 70 so as to communicate the central aperture of the elastic sleeve member 60 with the inlet channel 38 of the valve housing 34 through the central aperture of the metal sleeve member 70, and to make the central hole of the metal sleeve member 70 hold the rod 62 in such a way that it is slidable in the longitudinal direction. Furthermore, on the metal sleeve member 70 a collar 72 is mounted in order to locate the vessel 56 in the vicinity of the fluid inlet port 18 of the casing 14. One end of the rod 62 is tapered so as to easily move the rod 62 upon expansion of the wax 58. A temperature at which the wax 58 changes from the solid phase to the liquid phase and start the expansion can be changed in the range of 0° to 110° C. by changing the ratio of components of the wax 58.

An actuator member 74 is attached to the other end of the rod 62. The actuator member 74 extends through a support wall 76 formed in the inlet channel 38 and supporting the valve seat 42 and laterally abuts against the valve body 52 seated on the valve seat 42, as shown in FIG. 2. A seal ring 78 is mounted at the distal end of the actuator member 74, the seal ring 78 abuts against the support wall 76 when the valve body 52 is located in the closing position, thereby preventing the cooling medium existing at the upstream side with respect to the valve seat 42 in the inlet channel 38 from entering, through a through hole 80 of the support wall 76, into the upper tubes 16. At the proximal end of the actuator member 74 a flange 82 is formed or fixed, and between the flange 82 and the support wall 76 of the valve housing 34 a compression coil spring 84 as a biasing means is wound. The compression coil spring 84 biases the actuator member 74 and the rod 62 of the drive unit 54 to the right in FIG. 2. In other words, one end of the rod 62 is biased toward the closed end of the elastic sleeve member 60.

The operation of the oil cooler 12 having the control apparatus 10 according to the first embodiment of the present invention described above will now be described as follows.

A working oil compressed by a pump (not shown), being supplied from a reservoir (not shown) to a predetermined equipment (not shown) and being used therein, is delivered to the casing 14 of the oil cooler 12 through the inlet port 18. The working oil in the casing 14 flows in a zigzag manner in the casing 14 around the plurality of baffle boards 32 so as to contact the working oil with the tubes 16 for a relatively long period of time and returns to the reservoir through the outlet port 20.

The inlet channel 38 of the valve housing 34 of the control unit 10 is filled with cooling water supplied from the inlet opening 44 of the valve housing 34, as are the tubes 16 arranged at the upper and lower steps within the oil cooler 12, and the outlet channel 40 of the valve housing 34. However, as shown in FIGS. 1 and 2, since the valve body 52 is seated on the valve seat 42 or located in the closing position, the cooling water may not circulate through the inlet channel 38, the tubes 16 and the outlet channel 40. The valve body 52 is biased in the closing position by its self weight and by the water pressure applied to the inlet channel 38 through the inlet opening 44 of the valve housing 34.

Figure 3:
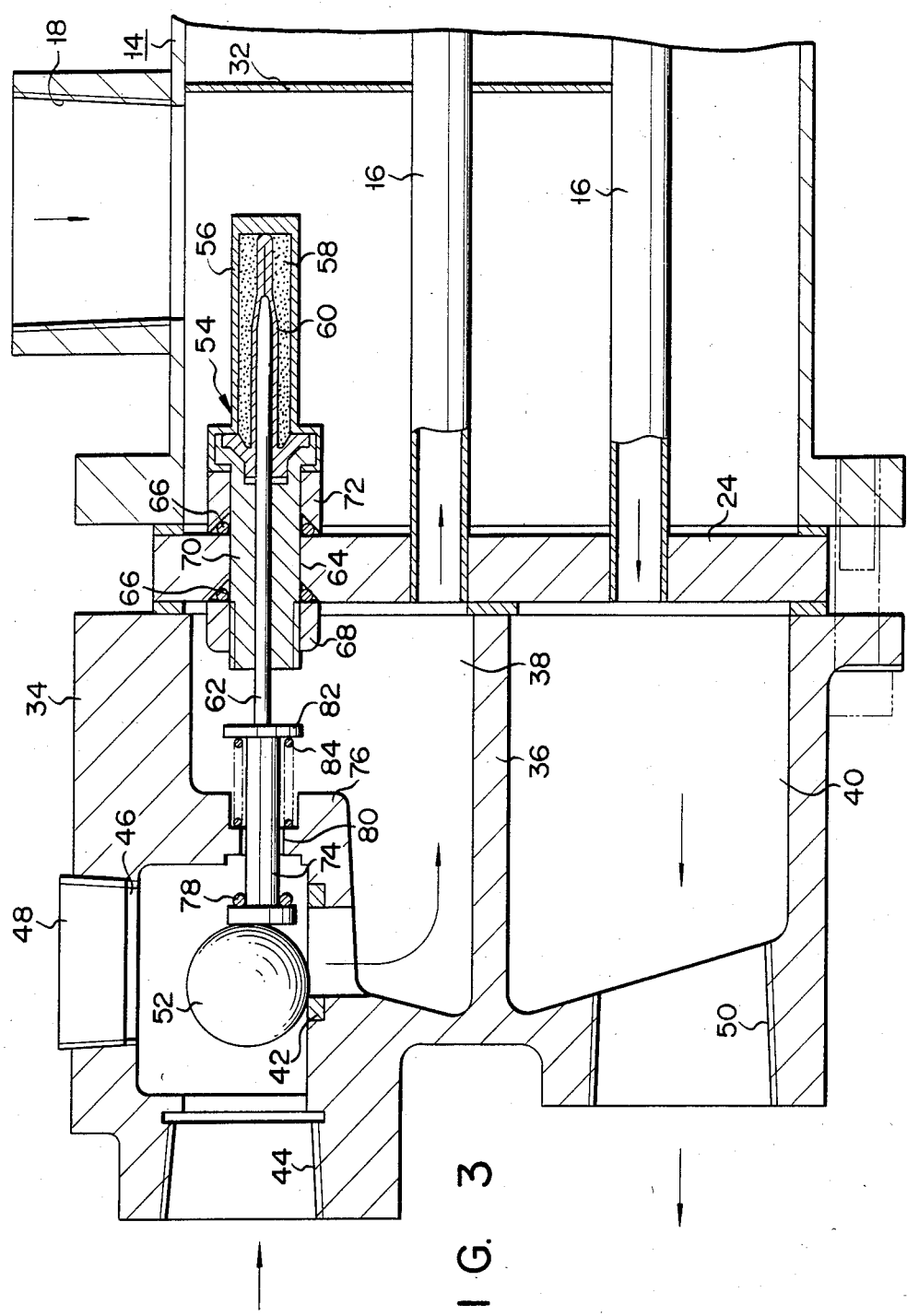
FIG. 3 is an enlarged view of the control apparatus shown in FIG. 1, wherein the valve body is located in the opening position.

When the working oil flowing into the casing 14 is heated above a given temperature, due to compression by the pump (not shown) and the work performed in the predetermined equipment, the wax 58 filled in the vessel 56 of the drive unit 54 is melted and increased in volume, that is, expanded, thereby compressing the elastic sleeve member 60, as shown in FIG. 3. Therefore, the rod 62 of the drive unit 54 is moved into the inlet channel 38 of the valve housing 34 against the biasing force of the compression coil spring 84, so that the valve body 52 is moved away from the valve seat 42 by the actuator member 74 against the weight of the valve body 52 and the pressure of the cooling water. As a result, the valve body 52 is located in the opening position, as shown in FIG. 3.

When the valve body 52 is located in the opening position, cooling water flows into the upper tubes 16 of the oil cooler 12 from the inlet opening 44 through the opening of the valve seat 42, and further flows into the outlet channel 40 of the valve housing 34 through the recess 28 of the channel case 30 and the lower tubes 16, and finally is discharged to the outside through the outlet opening 50 of the outlet channel 40. And therefore, heat exchange is performed between the cooling water flowing through the tubes 16 of the oil cooler 12 and the working oil in the casing 14. As a result, the working oil is cooled.

When the temperature of the working oil which flows in at the inlet port 18 of the casing 14 of the oil cooler 12 becomes below a predetermined temperature, the wax 58 in the vessel 56 of the drive unit 54 starts to contract. Before the wax 58 solidifies, the rod 62 and the actuator member 74 are moved to the right in FIG. 3 by the biasing force of the compression coil spring 84, so that the tapered end of the rod 62 is moved toward the closed end of the elastic sleeve member 60. Movement of the rod 62 and the actuator member 74 is stopped when the seal ring 78 at the distal end of the actuator member 74 abuts against the support wall 76 of the valve housing 34, as shown in FIG. 2. When the actuator member 74 is moved in the manner described above, the valve body 52 rolls toward the valve seat 42 by the pressure of the cooling water flowing from the opening 44 into the channel 38. As a result, the weight of the valve body 52 assists its movement, thereby locating the valve body 52 on the valve seat 42, or in the closing position, as shown in FIG. 2.

In this embodiment, the actuator member 74 is not coupled to the valve body 52 and is only brought into slight contact therewith. Therefore, if a strict dimensional tolerance at the time of manufacture is not set it is very easy to locate the actuating member 74 relative to the valve body 52 so as to make the valve body 52 have a good performance.

Figure 4:
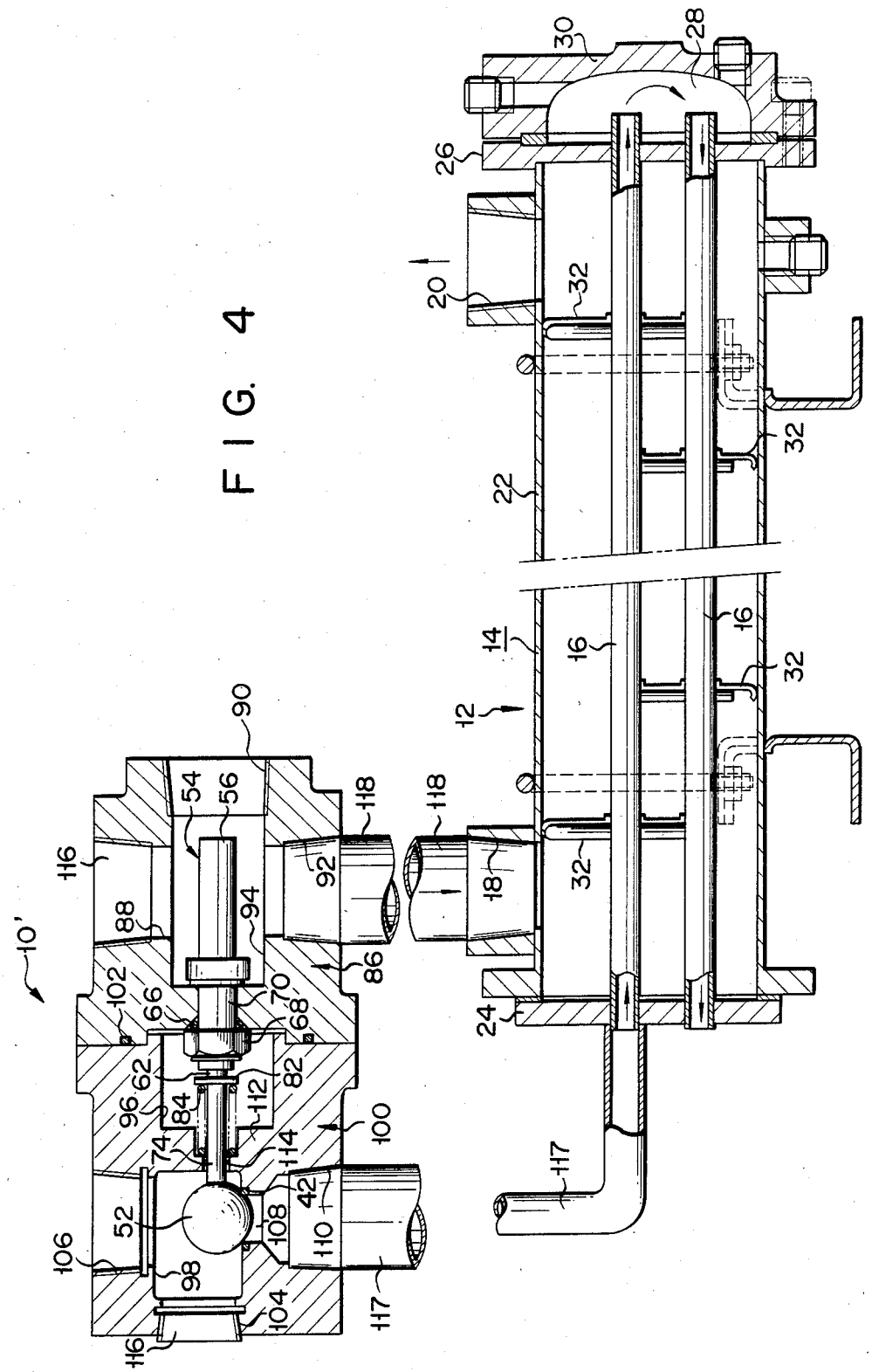
FIG. 4 is a longitudinal sectional view of a modification of the control apparatus shown in FIG. 1.

A modification of the first embodiment will now be described with reference to FIG. 4. Since the same reference numerals used in the first embodiment denote the same parts in this modification, a detailed description thereof will be omitted.

In a control apparatus 10' of this modification, the metal sleeve member 70 coupled to the vessel 56 of the drive unit 54 is attached by the nut 68 in a water-tight manner to a channel housing 86 through the seal ring 66. The vessel 56 is located in a chamber 94 of a channel housing 86 which communicates with the external atmosphere through openings 88, 90 and 92.

A valve housing 100 having a recess 96 for receiving the actuator member 74, the nut 68 and the rod 62 of the drive unit 54, and a valve chamber 98 for housing the spherical valve body 52 is watertightly coupled to the channel housing 86 through a seal ring 102. Inlet openings 104 and 106 are formed in the valve chamber 98. The valve seat 42 facing a direction opposite the direction in which the gravitational acceleration acts is formed within the valve chamber 98. The valve body 52 is seated on the valve seat 42 so as to close a central aperture 108 of the valve seat 42. The central aperture 108 communicates with the external atmosphere through an outlet opening 110. The distal end of the actuator member 74 is inserted in a through hole 114 formed in a partition wall 112 for separating the valve chamber 98 from the recess 96 and is located at the side of the valve body 52 located in the closing position. The compression coil spring 84 of the actuator member 74 is wound around the actuator member 74 such that the two ends of the spring 84 abut against the partition wall 112 of the valve housing 100 and the flange 82 of the actuator member 74, respectively.

When the control apparatus of this modification is combined with the oil cooler 12 shown in FIG. 1, one of the openings (104 or 106) of the valve housing 100 and one of the openings (88, 90 or 92) of the channel housing 86 are closed by plugs 116, the other openings 104, 106 of the valve housing 100 communicate with a cooling water source (not shown) through an extended tube (not shown), and the outlet opening 110 of the valve housing 100 communicates with one end of each of the upper tubes 16 of the oil cooler 12, through an extended tube 117. One of the remaining openings 90 or 92 of the channel housing 86 communicates with the outlet port of the predetermined equipment (not shown) which uses the working oil. The other of the remaining openings 90 or 92 communicates with the inlet port 18 of the casing 14 of the oil cooler 12 shown in FIG. 1 through an extended tube 118.

The control apparatus 10' comprising the modification of the first embodiment works in the same manner as the control apparatus 10 of the first embodiment. Whatever the oil cooler 12 has any construction, the control apparatus 10' having been such constructed is always able to be arranged is such a way that the valve seat 42 can be directed in the direction in which the gravitational acceleration acts.

Figure 5:
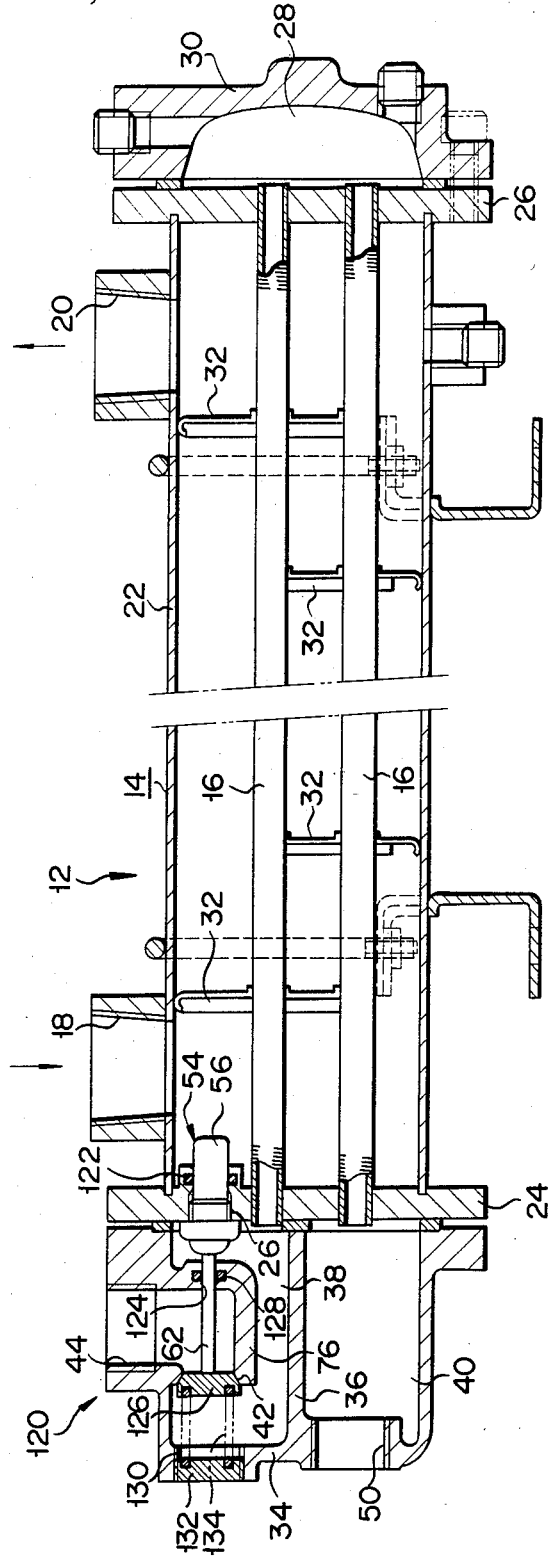
FIG. 5 is a longitudinal sectional view of an oil cooler (i.e., a heat exchanger) having a control apparatus according to a second embodiment of the present invention.
Figure 6:
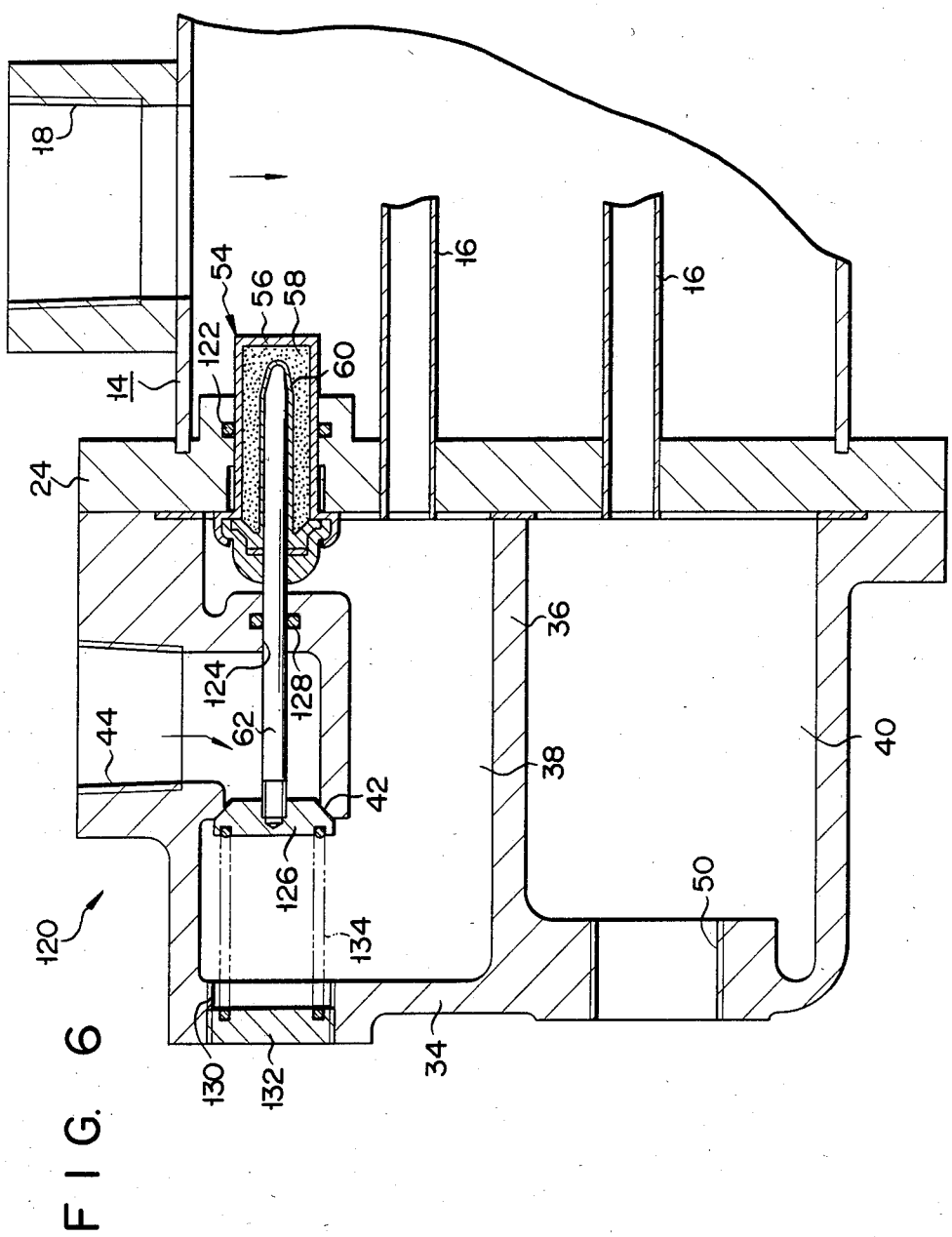
FIG. 6 is an enlarged view of the control apparatus shown in FIG. 5, wherein a valve body is located in the closing position.

A control apparatus 120 according to a second embodiment of the present invention will now be described with reference to FIGS. 5 to 7. Since the same reference numerals as used in the first embodiment denote the same parts in the second embodiment, a detailed description thereof will be omitted.

In the second embodiment, the vessel 56 of the drive unit 54 is directly screwed to the first end plate 24 of the casing 14 of an oil cooler 12 through a seal ring 122, so that it is fixed watertightly with respect to the first end plate 24. Part of the vessel 56 is exposed within the casing 14. The other end of the rod 62 of the drive member 54 is inserted into a through hole 124 formed in the support wall 76 of the valve housing 34, and is then fixed to a valve body 126 seated on the valve seat 42. The through hole 124 is rendered watertight by a seal ring 128 disposed in the through hole 124. A through hole 130 is formed in the outer wall of the valve housing 34 at a position opposing the central aperture of the valve seat 42. A cap 132 is screwed into the through hole 130. A compression coil spring 134 is disposed between the cap 132 and the valve body 126. The two ends of the compression coil spring 134 abut against the cap 132 and the valve body 126, respectively, so that the valve body 126 is biased to the closing position, as shown in FIGS. 5 and 6.

The inlet channel 38 of the valve housing 34 of the control unit 120 is filled with cooling water supplied from the inlet opening 44 of the valve housing 34, as are the tubes 16 arranged at the upper and lower steps within the oil cooler 12, and the outlet channel 40 of the valve housing 34. However, as shown in FIGS. 5 and 6, since the valve body 126 is seated on the valve seat 42, or located in the closing position, the cooling water may not circulate through the inlet channel 38, the tubes 16 and the outlet channel 40.

Figure 7:
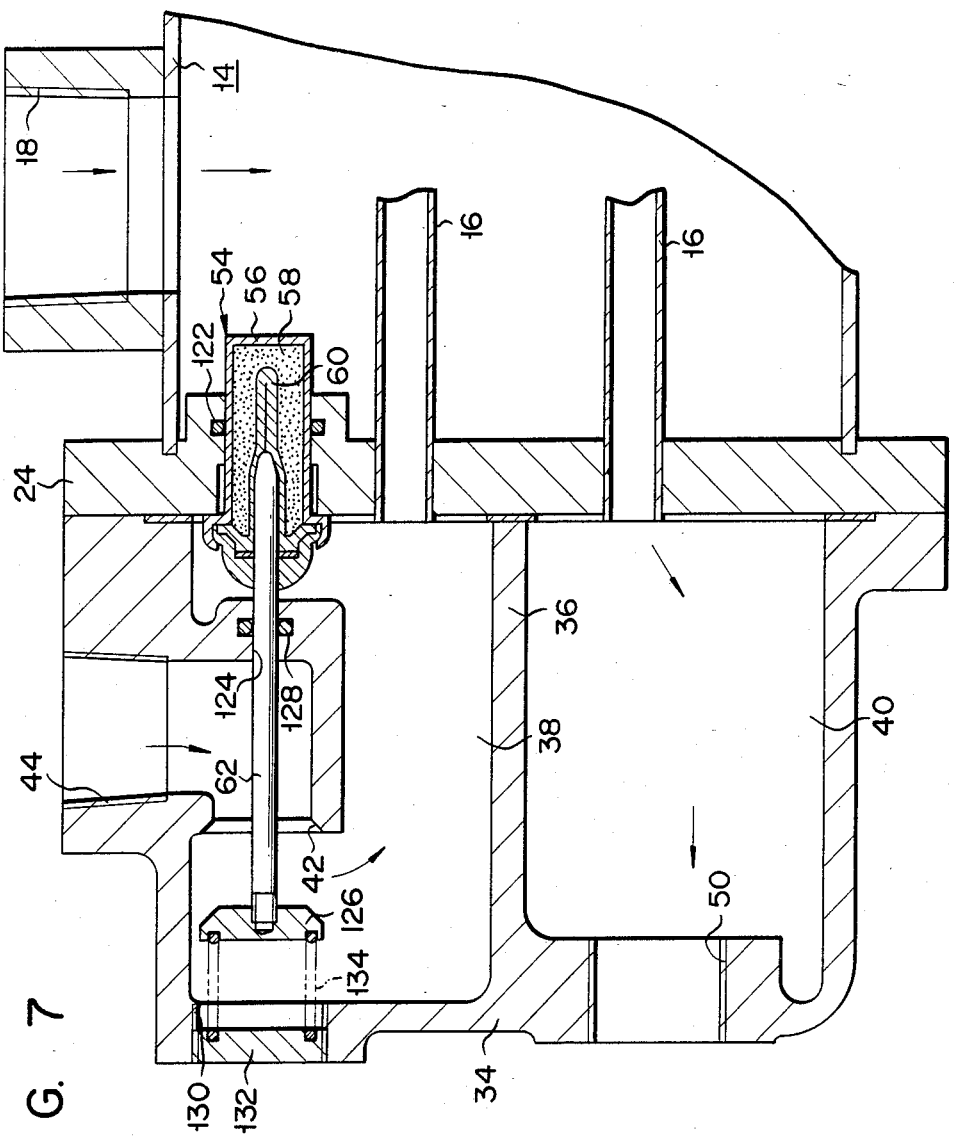
FIG. 7 is an enlarged view of the control apparatus shown in FIG. 5, wherein the valve body is located in the opening position.

When the working oil is heated above a given temperature, due to compression by the pump (not shown) and the work performed in the predetermined equipment, the wax 58 filled in the vessel 56 of the drive unit 54 is melted and increased in volume, that is, expanded thereby compressing the elastic sleeve member 60, as shown in FIG. 7. Therefore, the rod 62 of the drive unit 54 is moved into the inlet channel 38 of the valve housing 34 against the biasing force of the compression coil spring 134, so that the valve body 126 is moved away from the valve seat 42. As a result, the valve body 126 is located in the opening position, as shown in FIG. 7.

When the valve body 126 is located in the opening position, cooling water flows into the upper tubes 16 of the oil cooler 12 from the inlet opening 44 through the opening of the valve seat 42, and further flows into the outlet channel 40 of the valve housing 34 through the recess 28 of the channel case 30 and the lower tubes 16, and finally is discharged to the outside through the outlet opening 50 of the outlet channel 40. And therefore, heat exchange is performed between the cooling water flowing through the tubes 16 of the oil cooler 12 and the working oil in the casing 14. As a result, the working oil is cooled.

When the temperature of the working oil which flows in at the inlet port 18 of the casing 14 of the oil cooler 12 becomes below a predetermined temperature, the wax 58 in the vessel 56 of the drive unit 54 starts to contract. Before the wax 58 solidifies, the rod 62 is moved to the right in FIG. 7 by the biasing force of the compression coil spring 134, so that the tapered end of the rod 62 is moved toward the closed end of the elastic sleeve member 60. Movement of the rod 62 is stopped when the valve body 126 sits on the valve seat 42, or is located in the closing position, as shown in FIG. 6.

Figure 8:
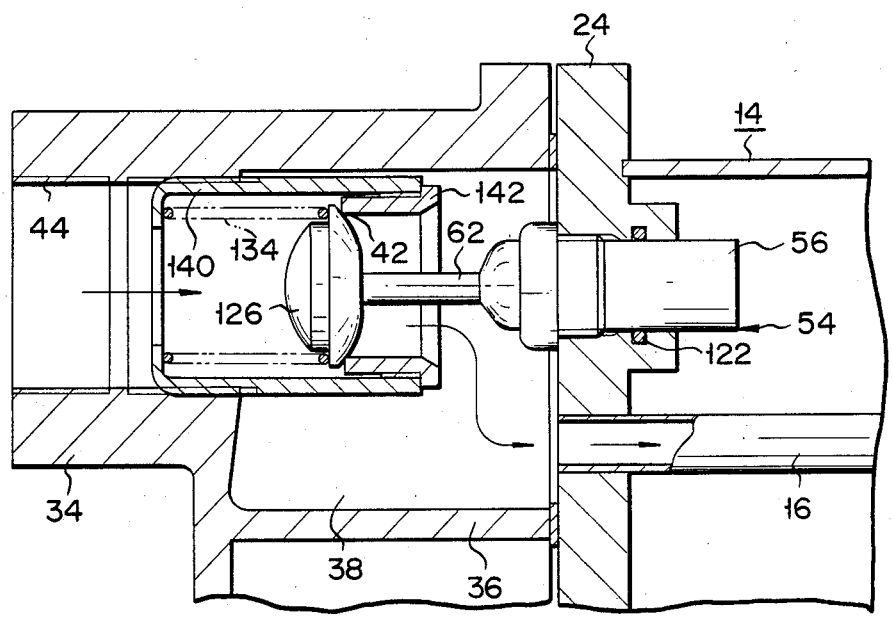
FIG. 8 is a longitudinal sectional view of a modification of the embodiment shown in FIG. 5.

A modification of the second embodiment will now be described with reference to FIG. 8. Since the same reference numerals used in the first and second embodiments denote the same parts in this modification, a detailed description thereof will be omitted.

A tubular valve seat support member 140 is screwed into the inlet channel 38 of the valve housing 34. A tubular valve seat member 142 is screwed into the valve seat support member 140 and the valve seat 42 is formed on the tubular valve seat member 142. The compression coil spring 134 is so disposed as to bias the valve body 126 to the closing position such that one end of the compression coil spring 134 abuts against the valve body 126 and the other end thereof abuts against the valve seat support member 140.

Another modification of the second embodiment will now be described with reference to FIG. 9. Since the same reference numerals used in the first and second embodiments denote the same parts in this modification, a detailed description thereof will be omitted.

Two valve seats 42 and 42' are formed in the inlet channel 38 of the valve housing 34. The two valve seats 42, 42' are formed in tandem with each other and oppose each other in the direction of travel of the rod 62 of the drive unit 54. The central aperture of the valve seat 42 communicates with one end of each of the upper tubes 16 of the oil cooler 12. The central aperture of the valve seat 42' communicates with the outlet channel 40 through a through hole 144 formed in the partition wall 36. The valve body 126 is seated on the valve seat 42, and one end of the rod 62 of the drive unit 54 is connected to the valve body 126. A through hole 130 is formed in the outer wall of the valve housing 34 in series with the valve seats 42 and 42', and a cap 132 is screwed in the through hole 130. One and the other ends of the compression coil spring 134 abut against the cap 132 and the valve body 126, respectively, so as to bias the valve body 126 onto the one valve seat 42.

Figure 9:
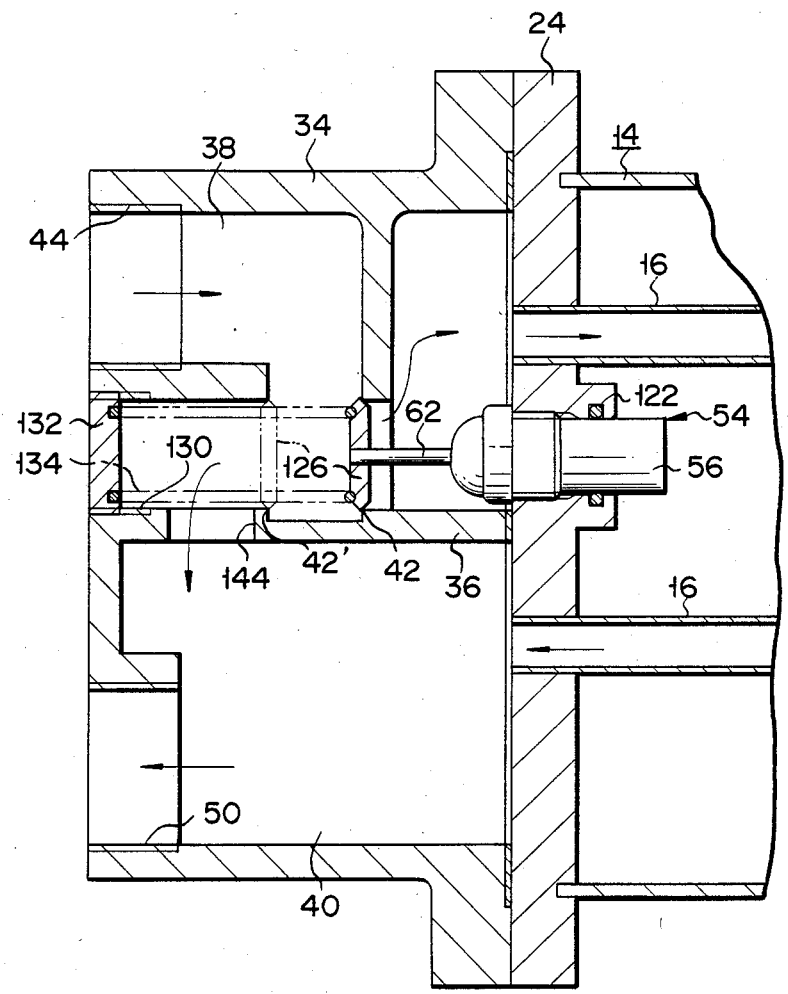
FIG. 9 is a longitudinal sectional view of another modification of the embodiment shown in FIG. 5.

When the temperature of the working oil flowing into the casing 14 is less than a predetermined value, the wax 58 in the drive unit 54 remains solidified, and the valve body 126 is seated on the valve seat 42, as indicated by the solid line in FIG. 9, so that the valve body 126 closes the central aperture of the valve seat 42. In this case, the cooling water flowing from the inlet opening 44 into the inlet channel 38 of the valve housing 34 flows directly to the outlet channel 40 through the central aperture of the valve seat 42' and the through hole 144 of the partition wall 36 and is discharged through the outlet opening 50. Therefore, the cooling water does not flow through the upper and lower tubes 16. As a result, the working oil in the casing 14 will not be cooled.

However, when the temperature of the working oil flowing into the casing 14 exceeds a predetermined value, the wax 58 in the drive unit 54 is melted and starts to expand and compress the elastic sleeve member 60. Therefore, the rod 62 is moved to the left, and the valve body 126 is moved from the valve seat 42 to the valve seat 42' against the biasing force of the compression coil spring 134. As a result, the valve body 126 abuts against the valve seat 42', as indicated by the two-dot chain line in FIG. 9. Then, the cooling water flowing from the inlet opening 44 of the valve housing 34 into the inlet channel 38 flows through the upper tubes 16 through the central aperture of the valve seat 42. This cooling water is further discharged to the outside through the dome-like recess 28 of the channel case 30, the outlet channel 40 and the outlet opening 50. The cooling water flowing through the tubes 16 takes heat from the working oil flowing within the casing 14. As a result, the working oil is cooled.

When the working oil in the casing 14 is cooled to a temperature below the predetermined temperature, the wax 58 in the vessel 56 of the drive unit 54 starts to contract, so that the valve body 126 is moved from the valve seat 42' to the valve seat 42 by the biasing force of the compression coil spring 134, and is seated on the valve seat 42, or located in the closing position, as indicated by the solid line in FIG. 9.

What is claimed is:

1. A control apparatus for a heat exchanger, comprising a casing through which a first fluid flows and a tube disposed within said casing for a second fluid to flow therethrough, thereby allowing a heat exchange to occur between the first and second fluids; the control apparatus being so arranged as to change the flow rate of the second fluid in accordance with a change in temperature of the first fluid so as to maintain the temperature of the first fluid at a constant level, and being characterized by comprising:

a valve housing communicating with an inlet port of said tube and having a valve seat which is directed in a direction opposite to the direction in which the gravitational acceleration acts;

a spherical valve body loosely disposed in said valve housing and movable therein transversely of said valve seat between a closed position where said valve body is placed on said valve seat to prevent the second fluid from flowing into said tube of the heat exchanger and an open position where said valve body is separated from said valve seat to allow the second fluid to flow into said tube of the heat exchanger, said valve housing being configured such that gravity and the pressure of the second fluid flowing into said valve housing biases said valve body toward the closed position; and a drive unit having:

a vessel mounted on said casing in such a way that part of said vessel is exposed to the first fluid which is flowing into said casing;

wax filled in said vessel and being expandable upon an increase in temperature;

an elastic sleeve member, one end of which opens toward said valve housing and the other end of which extends into said wax in said vessel so as to be surrounded by said wax, said elastic sleeve member being elastically compressible by the expansion of said wax; and a rod having one end inserted into said elastic sleeve member and the other end extending into said valve housing in a direction substantially transverse of said valve seat, said rod being moved toward said valve housing upon the compression of said elastic sleeve member to move said valve body from the closed position to the open position against said bias.

2. An apparatus according to claim 1, wherein said vessel of said drive unit is disposed on said casing and has a part which is exposed within said casing, and said valve housing is adjoined to said casing.

3. An apparatus according to claim 1, wherein a channel housing having a channel is coupled to said valve housing, said vessel of said drive unit is so disposed on said channel housing that a part of said vessel is exposed in said channel of said channel housing, said valve housing communicates with an inlet port of said tube of the heat exchanger through a first tube, and said channel of said channel housing communicates with an inlet port of said casing through a second tube.

* * * * *